Figure 1:
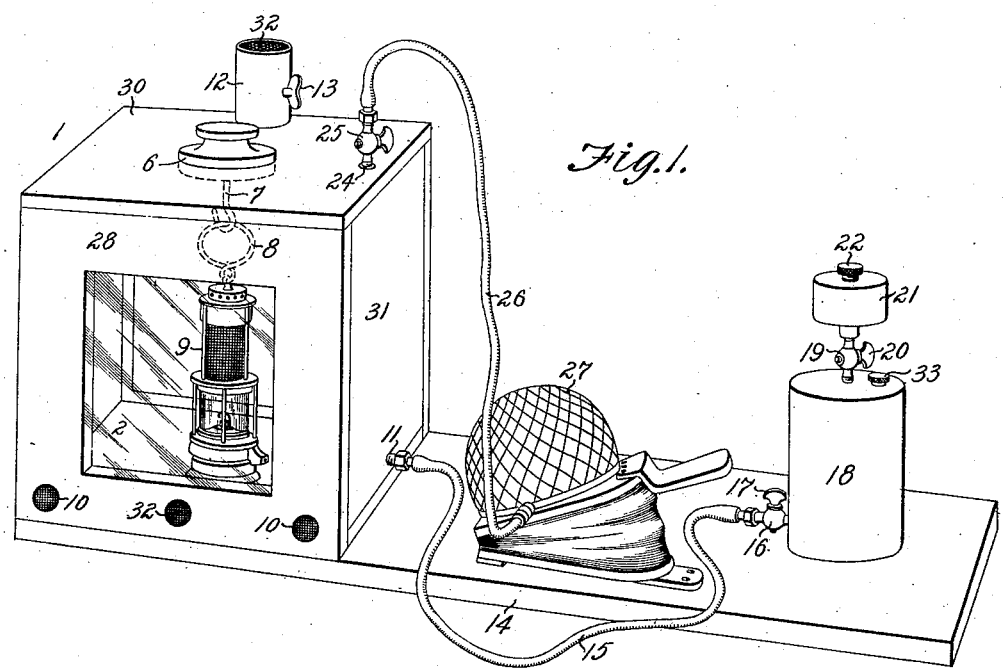

No. 869,066. PATENTED OCT. 22, 1907.
E. C. DAVIES.
APPARATUS FOR TESTING MINERS' SAFETY LAMPS.
APPLICATION FILED AUG. 9, 1905.

Witnesses
Milton O'Connell,
Walter L. Schanz.

Inventor
Evan C. Davies,
By his Attorney J. S. Prenner

UNITED STATES PATENT OFFICE.

EVAN C. DAVIES, OF TAYLOR, PENNSYLVANIA.

APPARATUS FOR TESTING MINERS' SAFETY-LAMPS.

No. 869,066.  Specification of Letters Patent.  Patented Oct. 22, 1907.

Application filed August 9, 1905. Serial No. 273,501.

*To all whom it may concern:*

Be it known that I, EVAN C. DAVIES, a citizen of the United States, residing at Taylor, in the county of Lackawanna and State of Pennsylvania, have invented certain new and useful Improvements in Apparatus for Testing Miners' Safety-Lamps; and I do hereby declare the following to be a full, clear, and exact description of the invention, such as will enable others skilled in the art to which it appertains to make and use the same.

The object of my invention is to provide a simple, inexpensive and efficient device for testing miner's safety lamps, for the purpose of determining whether or not the lamp would cause an explosion, when in an atmosphere containing an explosive gas. The test is conducted under the same conditions as would occur in actual practice, eliminating the possibility of fatal results, which might occur in case a defective lamp be carried in an atmosphere of fire damp.

The invention consists of a closure or chamber of a suitable material like wood, tin, copper, iron or similar material, within which the lamp to be tested is placed. Said chamber is filled with an explosive gas or mixture, which gas would explode should any defect be present in the burning lamp suspended in said chamber. Should the burning lamp in the chamber cause the gas to explode, the indications are that the lamp is defective, and should not be used in a mine containing fire damp. Should the lamp fail to explode the gas, it would indicate that the lamp is perfect and could be taken with safety in any kind of a mine.

I further provide a gas generator for generating the gas to be used in the testing chamber, preferably one in which acetylene gas is generated. But I do not intend to limit myself to the use of any one particular gas. Any other explosive gas would answer the purpose.

I further provide means for exhausting the testing chamber of gas, when one lamp is to be taken out, and another one to be put in for testing, by pumping the gas in an auxiliary vessel, and retaining it there until the testing chamber is ready, when it is returned to said chamber. I thus limit the amount of gas actually wasted and prevent said gas from escaping into the atmosphere.

I still further provide one wall of the testing chamber with a piece of glass or other transparent material, to enable the person testing to observe what is going on inside the chamber, said material while being transparent, must be air tight and of sufficient strength to withstand the pressure of the gas.

I still further provide a bright polished metal, or other bright covering for the wall opposite to the observation wall, for the purpose of causing the pressure of the explosion, caused by a defective lamp, to blow away from the observer so as to avoid the danger of the explosion breaking down the transparent material, and to save the observer from getting burned by the explosion.

In order to provide the necessary oxygen in the explosion or testing chamber, necessary to support combustion to keep the lamp burning, and also to allow for the necessary mixture of oxygen with the gas for the purpose of making the explosion, I provide openings in the bottom and top of the chamber covered with safety gauze, so as to allow air to circulate, in the same time preventing the gas from escaping into the atmosphere. The top ventilator I place preferably directly over the bright covering, to further assure that the air will force the explosion away from the observation partition.

In order to make the apparatus portable, I provide a tray and means for attaching the various parts on to said tray in the same time permitting the removal of all or any distinct part of said apparatus.

The invention also consists in certain other novel constructions, combinations, and arrangement of parts, as will be hereinafter fully described and claimed.

Figure 2:
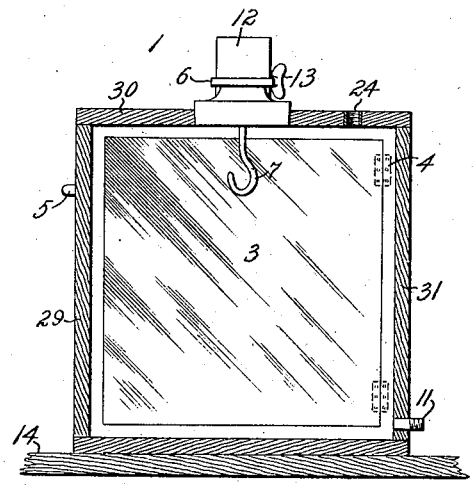
Figure 3:
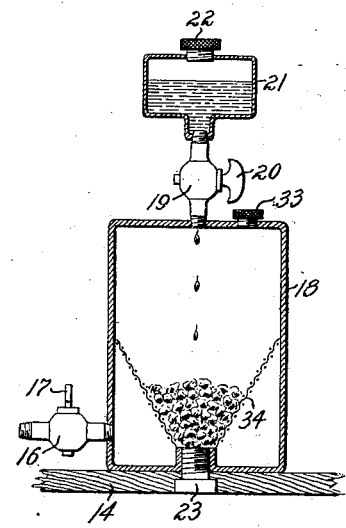

In the accompanying drawings Figure 1 is a perspective view of the testing apparatus. Fig. 2 is a cross section of the testing chamber. Fig. 3 is a cross sectional view of the generator.

In Fig. 1, 1 is the testing chamber in the shape of a parallelopipedon, but it may be of any other shape. 30 is its top, provided with a plug 6, which can be removed or inserted. The top is also provided with a chimney 12 covered with safety gauze 32 and a damper 13. It also has a nipple 24 provided with a cock 25. Over one end of the nipple 24 is slipped a rubber or other kind of tubing 26 connected to the bellows 27. The wall 31 of the chamber, has a nipple 11 over which is slipped a rubber or other kind of tube 15. The other end of tube 15 is slipped over nipple 16 of the generator 18. The nipple 16 is provided with a cock 17. The body of the generator 18 is made of sheet iron, gas-piping, or any suitable materials and conical on the inside as at 34. It is provided with a piece of small iron tubing or nipple 19 threaded at both ends. One end is screwed in the body of the generator proper, and has a cock 20 in the center and a cap 33. On the upper end is screwed the reservoir 21, provided with a removable cap 22.

The front face 28 of the chamber 1 is provided with a window 2 consisting of glass or similar transparent material with ventilating holes 10 and covered with safety gauze 32. The rear wall of the chamber is covered with a bright metal 3 as shown in Fig. 2 like tin or similar material and can be opened by removing cap or closed, being provided with hinges 4, and a clamp 5. The plug 6 has a hook 7 on its lower end, from which the lamp 9 to be tested is suspended by means of the hook 8. The bottom 14 of the chamber 1 is extended and is provided with a bolt 23, as shown in Fig. 3, to which the generator 18 can be attached.

The method of procedure in testing is as follows:

Light the lamp to be tested. Open the door 3 of the chamber 1, suspend the lamp 9 to be tested from the hook 7 of the plug 6, shut the door by means of clamp 5. See that cocks 25, 17 and 20 are closed. Place some carbid or other gas generating material in generator 18 through opening 33, put some water in reservoir 21 through opening 22. Open cock 20 sufficiently to let the water drip on the carbid 25 in the conical section 34. Open cock 17 to let the gas generated pass through tube 15 and nipple 11 into the chamber 1. Operate damper 13 of the chimney 12 until you can see through the window 2, that the lamp burns brightly. This would indicate that there is sufficient circulation of air mixed with the gas in the chamber to give the necessary amount of oxygen, which would cause the gas to explode, should the lamp be defective and allow the mixture of gas and air to come in contact with the flame of the lamp by leaking through the protecting gauze surrounding the lamp. If no explosion occurs it indicates conclusively that the lamp has no defects. Close cocks 20 and 17 to cut the gas off, open cock 25 and operate the bellows until the chamber is exhausted. Close cock 25, open door 3 and remove the lamp.

Having thus fully described my invention, what I claim as new, and desire to protect by Letters Patent is:

1. A testing apparatus for miner's safety lamps consisting of a closure to hold a lamp and an explosive gas, said closure being provided with an observation means, a means for deflecting an explosive away from the observation means, a means for admitting air in the closure, a means for preventing the gas from escaping, a means for filling and for exhausting the closure and a further means for charging the closure with an explosive gas from a primary source, and a means for cutting off the supply of the gas from the closure.

2. A testing apparatus for miner's safety lamps consisting of a closure properly constructed to accommodate a lamp for the purpose of detecting any defects in the safety devices of said lamp, said closure being provided with a means for receiving an explosive gas from a primary source, a source in which an explosive gas is generated, or supplied, said source being provided with a means for cutting off the gas, and for regulating the amount of the gas flowing to the closure.

3. A testing apparatus for miner's safety lamps consisting of a closure properly arranged to admit a miner's safety lamp for the purpose of testing and detecting defects in such lamps, a means for inserting and removing said lamps, a means for ventilating said closure, a means for admitting and regulating air within said closure, a means for permitting a tester to observe the action within the closure, a means for deflecting an explosion from the observer, a means for exhausting the closure, and for holding an exploding gas, a means for generating an explosive gas, and a means for regulating the amount of gas generated, said regulating means being a part of the source in which the explosive gas is generated, and the whole made portable, for the tester to carry it.

4. A testing apparatus for testing miner's safety lamps consisting of a testing chamber, a gas generator, and a means for exhausting the chamber and for filling the chamber with a testing or explosive gas.

EVAN C. DAVIES.

Witnesses:
C. L. ROBERTSON,
B. W. DERR.